United States Patent
Chuang et al.

(10) Patent No.: US 11,758,287 B2
(45) Date of Patent: Sep. 12, 2023

(54) METHOD FOR FILTERING NOISE OF LENS OPERATION AND VIDEO RECORDING SYSTEM

(71) Applicant: AVER INFORMATION INC., New Taipei (TW)

(72) Inventors: Ming Kang Chuang, New Taipei (TW); Chi-Fa Hsu, New Taipei (TW); Cheng-Mou Tsai, New Taipei (TW); Hsuan-Yuan Huang, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 0 days.

(21) Appl. No.: 17/686,234

(22) Filed: Mar. 3, 2022

(65) Prior Publication Data
US 2022/0286583 A1 Sep. 8, 2022

(30) Foreign Application Priority Data
Mar. 3, 2021 (TW) .................................. 110107424

(51) Int. Cl.
*H04N 23/81* (2023.01)
*H04N 5/926* (2006.01)

(52) U.S. Cl.
CPC ......... *H04N 23/811* (2023.01); *H04N 5/9265* (2013.01)

(58) Field of Classification Search
CPC .. H04N 5/2171; H04N 5/9265; H04N 9/7908; H04N 9/806; H04N 5/77
See application file for complete search history.

(56) References Cited

U.S. PATENT DOCUMENTS

2013/0089219 A1* 4/2013 Allen ................. G10K 11/1785
381/97

\* cited by examiner

*Primary Examiner* — Yogesh K Aggarwal
(74) *Attorney, Agent, or Firm* — Maschoff Brennan

(57) ABSTRACT

A method for filtering noise of lens operation is applicable to a controller being communicably connected with a video recorder. The method includes: sending, by the controller, a recording instruction configured to control the video recorder to perform a video recording and an audio recording; sending, by the controller, a lens operation instruction configured to control a lens of the video recorder to perform an operation; reading, by the controller, an inverted noise signal associated with the operation receiving, by the controller, an audio recording signal generated by the video recorder when the video recorder performs the operation; and synthesizing, by the controller, the audio recording signal and the inverted noise signal to output a synthesized audio signal.

5 Claims, 3 Drawing Sheets

METHOD FOR FILTERING NOISE OF LENS OPERATION AND VIDEO RECORDING SYSTEM

CROSS-REFERENCE TO RELATED APPLICATIONS

This non-provisional application claims priority under 35 U.S.C. § 119(a) on Patent Application No(s). 110107424 filed in Taiwan, ROC on Mar. 3, 2021, the entire contents of which are hereby incorporated by reference.

BACKGROUND

1. Technical Field

This disclosure relates to noise filtering, and more particularly to a method for filtering noise of lens operation and a video recording system.

2. Related Art

A document camera is an image projection device. The plane document data or the three-dimensional physical content can be projected for the user to view through the document camera. Document cameras are often used for presentations in classrooms or conferences. Since the content of the projected data is not in the form of digital files, it must be captured through the lens of the document camera. The image content captured by the document camera lens can be presented through the display device, or the displayed content can be projected on the screen.

The existing document camera involves the operation of the drive motor when the camera lens performs scaling or focusing operations. However, the mechanical sound generated by the running motor is recorded during the video recording, which causes the user to hear the noise irrelevant to the content presented by the document camera, and degrades the viewing experience.

SUMMARY

Accordingly, the present disclosure provides a method for filtering noise of lens operation and a video recording system.

According to an embodiment of the present disclosure, a method for filtering noise of lens operation applicable to a controller being communicably connected to a video recorder comprising: sending, by the controller, a recording instruction configured to control the video recorder to perform a video recording and an audio recording; sending, by the controller, a lens operation instruction configured to control a lens of the recorder to perform an operation; reading, by the controller, an inverted noise signal associated with the operation; receiving, by the controller, an audio recording signal generated by the video recorder when the video recorder performs the operation; and synthesizing, by the controller, the audio recording signal and the inverted noise signal to output a synthesized audio signal According to an embodiment of the present disclosure, a method for filtering noise of lens operation applicable to a controller and a video recorder comprising: establishing, by the controller, a connection between the controller and the video recorder; receiving, by the video recorder, a recording instruction configured to control the video recorder to perform a video recording and control a microphone of the video recorder to generate an audio recording signal; controlling, by the controller, the video recorder to enter an audio monitor mode after the video recorder performs the video recording; in the audio monitor mode, determining, by the video recorder, whether the video recorder receives a lens operation instruction, and sending, by the video recorder, a notification signal when the video recorder receives the lens operation instruction, wherein the lens operation instruction is configured to control a lens of the video recorder to perform an operation; after receiving the notification signal by the controller, reading, by the controller, an inverted noise signal associated with the operation and sending, by the controller, a permission signal to the video recorder; and after receiving the permission signal by the video recorder, performing, by the video recorder, the operation according to the lens operation instruction and receiving, by the controller, the audio recording signal.

According to an embodiment of the present disclosure, a video recording system comprising: a video recorder comprising lens performing a video recording and a microphone performing an audio recording to generate an audio recording signal; and a controller comprising: a communication circuit communicably connected to the video recorder; a storage circuit storing an inverted noise signal and a plurality of instructions; and a processor electrically connected to the communication circuit and the storage circuit, wherein the processor is configured to perform one of the plurality of instructions or control the communication circuit to send one of the plurality of instructions, and the plurality of instructions comprises: a recording instruction being sent to the video recorder through the communication circuit to control the video recorder to perform a video recording and an audio recording; a lens operation instruction being sent to the video recorder through the communication circuit to control the lens of the video recorder to perform an operation; and a synthesizing instruction performing by the processor to read the inverted noise signal and synthesizing the audio recording signal and the inverted noise signal to output a synthesized audio signal.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
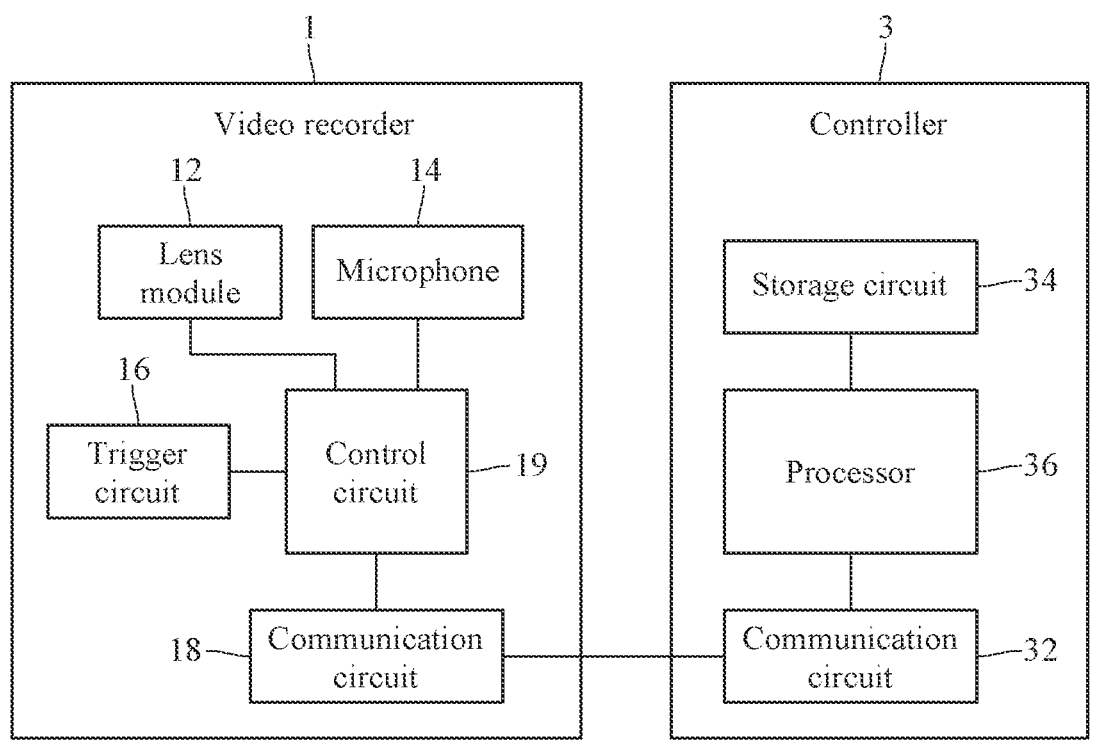
FIG. 1 is a block diagram of the video recording system according to an embodiment of the present disclosure.

FIG. 1 is a block diagram of the video recording system according to an embodiment of the present disclosure The video recording system 10 includes a video recorder 1 and a controller 3, and the video recorder 1 is communicably connected to a video recorder 3. In practice, the video recorder 1 may be, for example, a document camera, and the controller 3 may be, for example, a computer, with a driver or an operating software having already been installed in the computer thereby providing user an interface for operating various functions of the document camera. However, the video recorder 1 and the controller 3 are not limited by the above example.

As shown in FIG. 1, the video recorder 1 includes a lens module 12, a microphone 14, a trigger circuit 16, a communication circuit 18, and a control circuit 19.

The lens module 12 is configured to perform a video recording. In practice, the lens module 12 includes, for example, a lens and a driver motor (not depicted). The driver motor is configured to adjust the focus length of the lens or perform the focusing operation. The microphone 14 is configured to perform an audio recording and generate an audio recording signal.

The trigger circuit 16 is configured to detect a first triggering operation or a second triggering operation. The first triggering operation is configured to enable a video recording and an audio recording. The second triggering operation is configured to enable a lens operation. In practice, the trigger circuit 16 may be, for example, one or more physical button(s) or one or more switch(es). The present disclosure does not limit the hardware structure of the trigger circuit 16. In other embodiment, the video recorder 1 does not include the trigger circuit 16, and the first triggering operation or the second triggering operation is detected by the controller 3.

The communication circuit 18 is configured to send the audio recording signal generated by the video recorder 1 to the controller 3. The communication circuit 18 is further configured to send the notification signal to the controller 3 and receive a permission signal sent from the controller 3. The notification signal and the permission signal are associated with the aforementioned second triggering operation. Specifically, in an embodiment of the present disclosure, when user would like to perform a scaling operation or a focusing operation associated with the lens module 12 of the video recorder 3, the video recorder 1 firstly notify the controller 3, and perform the lens operation designated by the user only after receiving the permission signal sent by the controller 3.

The controller 3 includes a communication circuit 32, a storage circuit 34, and a processor 36.

The controller 3 is communicably connected to the communication circuit 18 of the video recorder 1 through the communication circuit 32.

The storage circuit 34 is configured to storage an inverted noise signal and a plurality of instructions. In an embodiment of the present disclosure, the mechanical noise generated during the scaling operation or the focusing operation of the lens module 12 of the video recorder 1 is pre-recorded, and the mechanical noise is stored in the storage circuit 34 after reverse processing. In another embodiment of the present disclosure, based on the video recorders 1 with different model numbers, the storage circuit 34 stores a plurality of inverted noise signals, and each inverted noise signal corresponds to one of the model numbers of the video recorder 1. In further another embodiment of the present disclosure, based on lens operations in different categories, such as scaling operation and focusing operation, the storage circuit 34 stores a plurality of inverted noise signal, and each inverted noise signal corresponds to one of the categories of the lens operation.

The plurality of instructions stored by the storage circuit 34 includes a video recording instruction, a lens operation instruction, a synthesizing operation, and a model-number detecting instruction, etc. However, the present disclosure is not limited by the above examples.

The processor 36 is electrically connected to the communication circuit 32 and the storage circuit 34. In practice, the user may enable the video operation through the user interface provided by the software operating on the controller 3, and the processor 36 sends a video recording instruction to the video recorder 1 through the communication circuit 32, and thereby controlling the video recorder 1 to perform the video recording and the audio recording. After the video recorder 1 starts performing the video recording, the user may enable the lens operation through the user interface provided the software operating on the controller. The lens operation may be, for example, an auto focusing (AF) operation or a focus-length adjustment, which may achieve the effect of zoom-in or zoom-out. At the same time, the processor sends the lens operation to the video recorder 1 through the communication circuit 32, and thereby controlling the lens module 12 of the video recorder 1 to perform the designated operation.

In an embodiment of the present disclosure, the video recording operation and the lens operation may be enabled by the controller 3. In another embodiment, the video recording operation and the lens operation may be enabled by the trigger circuit 16 equipped by the video recorder 1. In other words, the present disclosure does not limit the subject performing the aforementioned operations.

The processor 36 may perform a synthesizing instruction to read the inverted noise signal stored in the storage circuit 34 and synthesize the audio recording signal and the inverted noise signal to output a synthesized audio signal. The audio recording signal in sent to the communication circuit 32 of the controller 3 through the communication circuit 18 of the video recorder 1. In another embodiment, the storage circuit 34 stores a recorded noise signal. When the processor 36 performing the synthesizing instruction, the processor 36 instantly performs an inversion operation upon the noise signal and synthesize the inversion result and the audio recording signal to eliminate the noise of the operation of the lens module 12.

The processor may perform a model-number detecting instruction, and thereby driving the controller 3 to detect the model number of the video recorder 1. After the model number of the video recorder 1 is detected, the processor 36 obtains the inverted noise signal corresponding to the model number from the storage circuit 34 according to the model number.

The video recording system proposed by the present disclosure in the aforementioned embodiments pre-stores the inverted noise signal generated when a document camera of a known model number performs the image scaling operation or the focusing operation. If the image scaling operation or focusing operation has to be performed during the video recording process, the video recording system proposed by the present disclosure in the aforementioned embodiments may read the inverted noise signal corresponding to the model number of the current video recorder 1, synthesize the inverted noise signal together with the audio track of the video recording file, and thereby filtering the noise generated by performing the image scaling operation or the focusing operation.

The following describes two embodiments of the method for filtering noise of lens operation. In overall, the first embodiment relates to a controller 3 (equivalent to a software end) performing the image scaling operation or focusing operation, whereas the second embodiment related to a video recorder 1 (equivalent to a hardware end) performing the image scaling operation or focusing operation.

Figure 2:
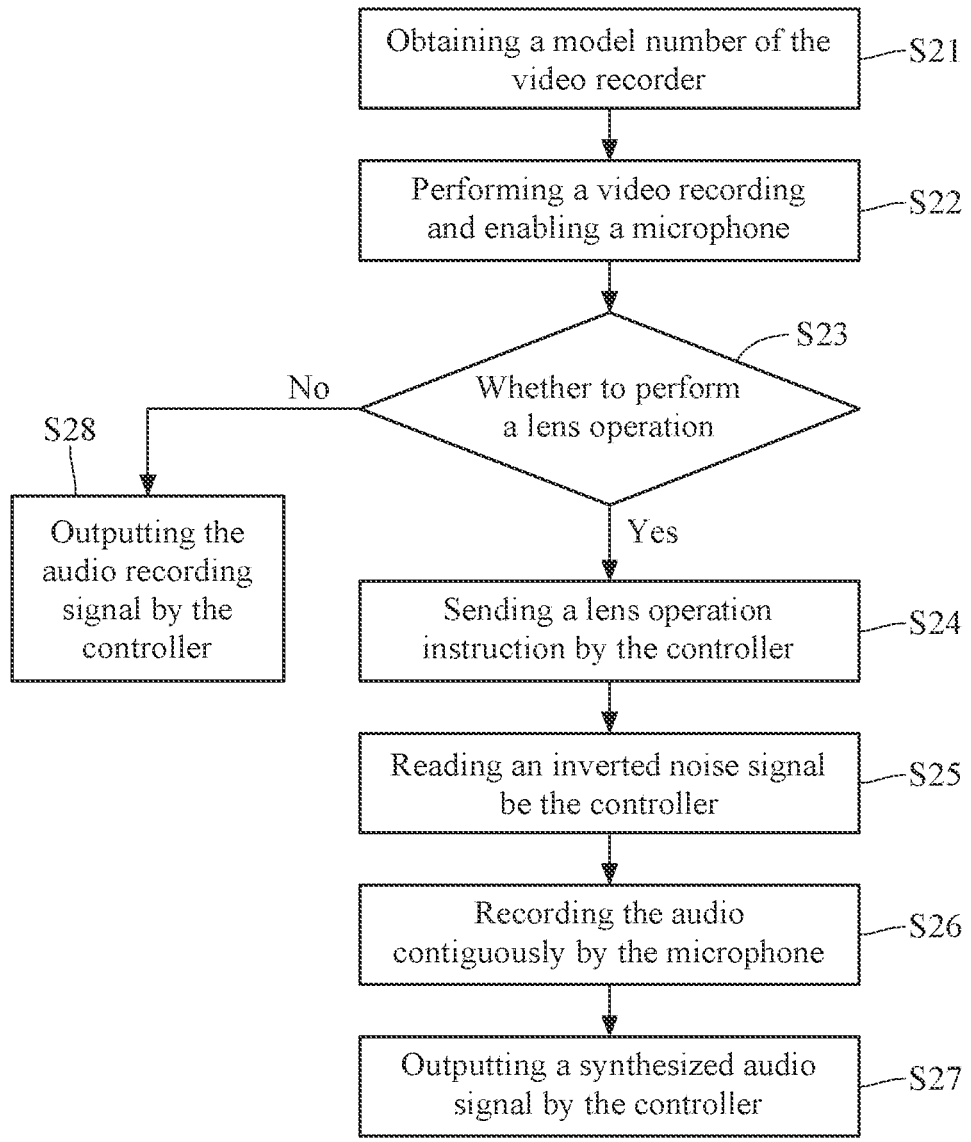
FIG. 2 is a flow chart of a method for filtering noise of lens operation according to a first embodiment of the present disclosure.

FIG. 2 is the flow chart of the method for filtering noise of lens operation according to the first embodiment of the present disclosure. Said method is applicable to the aforementioned controller 3, and this controller 3 is configured to be communicably connected to the aforementioned video recorder 1. Said method includes steps shown in FIG. 2.

Step S21 represents "obtaining a model number of the video recorder".

Step S22 represents "performing a video recording and enabling a microphone", i.e., the controller sends a video recording instruction configured to control the video recorder 1 to perform the video recording and the audio recording.

Step S23 is to determine "whether to perform a lens operation". If the determination result is "yes", step S24 is the next step. If the determination result is "no", step S28 is the next step.

Step S24 represents "sending a lens operation instruction by the controller". The lens operation instruction is configured to controller the lens module 12 of the video recorder 1 to perform an operation, such as the scaling operation or the focusing operation.

Step S25 represents "reading an inverted noise signal by the controller". The inverted noise signal is associated with the aforementioned operation. An implementation example of step S25 is that the controller 3 reads the inverted noise signal corresponding to the model number of the video recorder 1. Specifically, the controller selects one of a plurality of candidate inverted noise signals according to a model number of the video recorder 1. Another implementation example of step S25 is that the controller 3 reads the inverted noise signal corresponding to one of the categories of the lens operation, wherein the categories include a scaling operation and a focusing operation. Specifically, the controller 3 selects one of the plurality of candidate inverted noise signals according to the category of the lens operation instruction.

Step S26 represents "recording the audio contiguously by the microphone". The recorded audio signal includes the noise of performing lens operation. In step S26, the controller 3 receives the audio recording signal generated by the video recorder 1 when the video recorder performs the operation described in step S24.

Step S27 represents "outputting a synthesized audio signal by the controller". Specifically, the controller 3 synthesizes the audio recording signal and the inverted noise signal and output the synthesized audio signal. The synthesized audio signal may be served as the audio track of the video recording file.

Step S28 represents "outputting the audio recording signal by the controller". Specifically, if the determination result of step S23 is "no", the controller writes the original audio recording signal directly to the video recording file without additionally performing the synthesizing instruction to synthesize the audio recording signal and the inverted noise signal.

Figure 3:
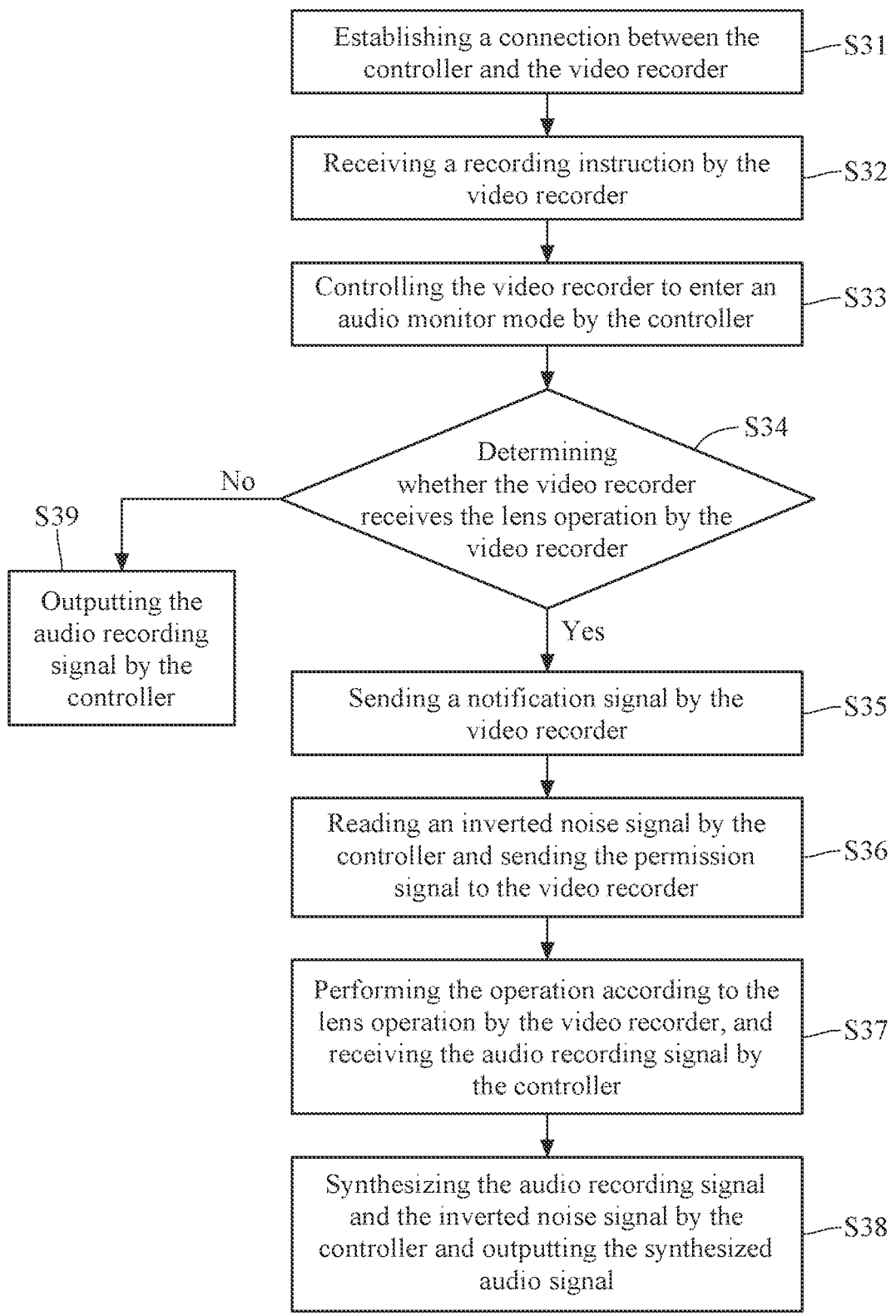
FIG. 3 is a flow chart of a method for filtering noise of lens operation according to a second embodiment of the present disclosure.

FIG. 3 is the flow chart of the method for filtering noise of lens operation according to the second embodiment of the present disclosure. Said method is applicable to the aforementioned controller 3 and the video recorder 1. Said method includes steps as shown in FIG. 3.

Step S31 represents "establishing a connection between the controller and the video recorder". The present disclosure does not limit the type of the communicable connection should be wired or wireless. In addition, in step S31, when the connection is established, the controller 3 may detect the model number of the video recorder 1 as described in step S21 of FIG. 2.

Step S32 represents "receiving a recording instruction by the video recorder". The recording instruction is configured to control the video recorder 1 to perform a video recording and control the microphone 14 of the video recorder 1 to generate an audio recording signal. The generation method of the recording instruction may be, for example, an operation of the trigger circuit 16 triggered by the user. Step S32 is similar to step S22 of FIG. 22.

Step S33 represents "controlling the video recorder to enter an audio monitor mode by the controller". Specifically, if the user expects to perform the lens operation during the video recording, the user may control the video recorder 1 to enter the audio monitor mode by user interface provided by the controller 3 after the video recorder 1 performs the video recording. The video recorder 1 entering the audio monitor mode may continue to perform the flow of steps S34-S38. The video recorder 1 not entering the audio monitor mode may perform a normal video recording operation, and the present disclosure does not additionally describe the detail here.

Step S34 represents "determining whether the video recorder receives the lens operation by the video recorder", and step S35 represents "sending a notification signal by the video recorder". If the determination result of step S34 is "yes", the video recorder 1 staying in the audio monitor mode may notify the controller 3 once receiving the lens operation. If the determination result of step S34 is "no", step S39 is the next step. Said lens operation is configured to control the lens module 12 of the video recorder 1 to perform an operation.

After the controller 3 receives the notification signal, step S36 represents "reading an inverted noise signal by the controller and sending the permission signal to the video recorder". The inverted noise signal is associated with the lens operation instruction. An example of step S35 is that the controller 3 reads the inverted noise signal corresponding to the model number of the video recorder 1. Another example of step S35 is that the controller 3 reads the inverted noise signal correspond to a category of the lens operation, wherein said category comprises a scaling operation and a focusing operation.

After the video recorder 1 receives the permission signal, step S37 represents "performing the operation according to the lens operation by the video recorder, and receiving the audio recording signal by the controller".

Step S38 represents "synthesizing the audio recording signal and the inverted noise signal by the controller and outputting the synthesized audio signal". Step S38 is similar to step S27 of FIG. 2.

Step S39 represents "outputting the audio recording signal by the controller". Specifically, if the determination result of step S34 is "no", the controller 3 may output the audio recording signal directly in step S39. Step S39 is similar to step S28 of FIG. 2.

In view of the above, the video recording system and the method for filtering noise of lens operation proposed by the present disclosure may effectively reduce the mechanical noise generated by the lens operation during the video recording, the noise filter operation corresponds to the model number of different document camera, and thus the present disclosure improve the user experience during watching the video.

What is claimed is:

1. A method for filtering noise of lens operation applicable to a controller and a video recorder comprising:
    establishing, by the controller, a connection between the controller and the video recorder;
    receiving, by the video recorder, a recording instruction configured to control the video recorder to perform a video recording and control a microphone of the video recorder to generate an audio recording signal;
    controlling, by the controller, the video recorder to enter an audio monitor mode after the video recorder performs the video recording;
    in the audio monitor mode, determining, by the video recorder, whether the video recorder receives a lens operation instruction, and sending, by the video recorder, a notification signal when the video recorder receives the lens operation instruction, wherein the lens operation instruction is configured to control a lens of the video recorder to perform an operation;
    after receiving the notification signal by the controller, reading, by the controller, an inverted noise signal associated with the operation and sending, by the controller, a permission signal to the video recorder; and
    after receiving the permission signal by the video recorder, performing, by the video recorder, the operation according to the lens operation instruction and receiving, by the controller, the audio recording signal.

2. The method for filtering noise of lens operation of claim 1 further comprising:
    obtaining, by the controller, a model number of the video recorder after the connection is established;
    wherein reading, by the controller, the inverted noise signal associated with the operation comprises: selecting, by the controller, one of a plurality of candidate inverted noise signals according to the model number.

3. The method for filtering noise of lens operation of claim 1, wherein the notification signal has a category of the lens operation instruction, and reading, by the controller, the inverted noise signal associated with the operation comprises:
    selecting, by the controller, one of a plurality of candidate inverted noise signals according to the category, wherein the category comprises a scaling operation and a focusing operation.

4. A video recording system comprising:
    a video recorder comprising lens performing a video recording and a microphone performing an audio recording to generate an audio recording signal; and
    a controller comprising:
        a communication circuit communicably connected to the video recorder;
        a storage circuit storing an inverted noise signal and a plurality of instructions; and
        a processor electrically connected to the communication circuit and the storage circuit, wherein the processor is configured to perform one of the plurality of instructions or control the communication circuit to send one of the plurality of instructions, and the plurality of instructions comprises:
            a recording instruction being sent to the video recorder through the communication circuit to control the video recorder to perform a video recording and an audio recording;
            a lens operation instruction being sent to the video recorder through the communication circuit to control the lens of the video recorder to perform an operation; and
    a synthesizing instruction performing by the processor to read the inverted noise signal and synthesizing the audio recording signal and the inverted noise signal to output a synthesized audio signal;
    wherein the video recorder further comprises:
    a trigger circuit detecting a triggering operation;
    a communication circuit sending the audio recording signal and a notification signal and receiving a permission signal; and
    a control circuit electrically connected to the trigger circuit and the communication circuit, wherein:
        the control circuit controls the communication circuit to send the notification signal to the controller when the trigger circuit detects the triggering operation; and
        the control circuit controls the video recorder to perform the operation according to the lens operation instruction when the communication circuit receives the permission signal.

5. The video recording system of claim 4, wherein the plurality of instructions further comprises a model-number detecting instruction driving the controller to detect a model number of the video recorder, and the model number is associated with the inverted noise signal.

* * * * *